(12) United States Patent
Uchida et al.

(10) Patent No.: US 8,559,674 B2
(45) Date of Patent: Oct. 15, 2013

(54) MOVING STATE ESTIMATING DEVICE

(75) Inventors: Naohide Uchida, Suntou-gun Shizuoka (JP); Tatsuya Shiraishi, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 584 days.

(21) Appl. No.: 12/682,976

(22) PCT Filed: Dec. 24, 2008

(86) PCT No.: PCT/JP2008/073375
§ 371 (c)(1),
(2), (4) Date: Apr. 14, 2010

(87) PCT Pub. No.: WO2009/081920
PCT Pub. Date: Jul. 2, 2009

(65) Prior Publication Data
US 2010/0226544 A1    Sep. 9, 2010

(30) Foreign Application Priority Data

Dec. 25, 2007  (JP) ................................. 2007-332275

(51) Int. Cl.
  *G06K 9/00*  (2006.01)
(52) U.S. Cl.
  USPC ........................................ 382/106; 382/107
(58) Field of Classification Search
  USPC ........................................ 382/106, 107, 190
  See application file for complete search history.

(56) References Cited

U.S. PATENT DOCUMENTS

| | | | | |
|---|---|---|---|---|
| 2001/0055063 A1* | 12/2001 | Nagai et al. | ................... | 348/116 |
| 2004/0236484 A1* | 11/2004 | Tsuchiya | ........................ | 701/29 |
| 2005/0163343 A1* | 7/2005 | Kakinami et al. | ............ | 382/103 |
| 2007/0227798 A1* | 10/2007 | Takehara et al. | ............... | 180/274 |
| 2007/0236561 A1 | 10/2007 | Anai et al. | | |

FOREIGN PATENT DOCUMENTS

| | | |
|---|---|---|
| EP | 1431120 A1 | 6/2004 |
| JP | 2002048513 A | 2/2002 |
| JP | 2004198211 A | 7/2004 |
| JP | 2006350897 A | 12/2006 |
| JP | 2007278845 A | 10/2007 |

OTHER PUBLICATIONS

Yamaguchi K. et al., "Vehicle ego-motion estimation and moving object detection using a monocular camera", IEEE 2006, 18th International Conference on Pattern Recognition, IEEE Comput. Soc; pp. 20-24. Sep. 2006.

(Continued)

*Primary Examiner* — John Strege
(74) *Attorney, Agent, or Firm* — Gifford, Krass, Sprinkle, Anderson & Citkowski, P.C.

(57) ABSTRACT

A moving state estimating device (100) includes a feature point candidate extracting part (10) configured to extract feature point candidates in an image taken at a first time point by an imaging sensor (2) mounted on a vehicle, a positional relation obtaining part (11) configured to obtain a positional relation of an actual position of each feature point candidate relative to the vehicle, a feature point selecting part (12) configured to select a feature point candidate as a feature point based on the positional relation of the feature point candidate, a corresponding point extracting part (13) configured to extract a corresponding point in an image taken by the imaging sensor (2) at a second time point corresponding to the selected feature point, and a moving state estimating part configured to estimate a moving state of the vehicle from the first time point to the second time point based on a coordinate of the selected feature point and a coordinate of the corresponding point.

7 Claims, 5 Drawing Sheets

(56) References Cited

OTHER PUBLICATIONS

C.G. Harris, "Determination of ego-motion from matched points", Third Alvey Vision Conference, pp. 189-192, 1987, http://www.bmva.org/bmvc/1987/avc-87-026.pdf.

German Office Action issued Jan. 11, 2012 from German Patent Application No. 11 2008 003 486.9 with English translation.

* cited by examiner

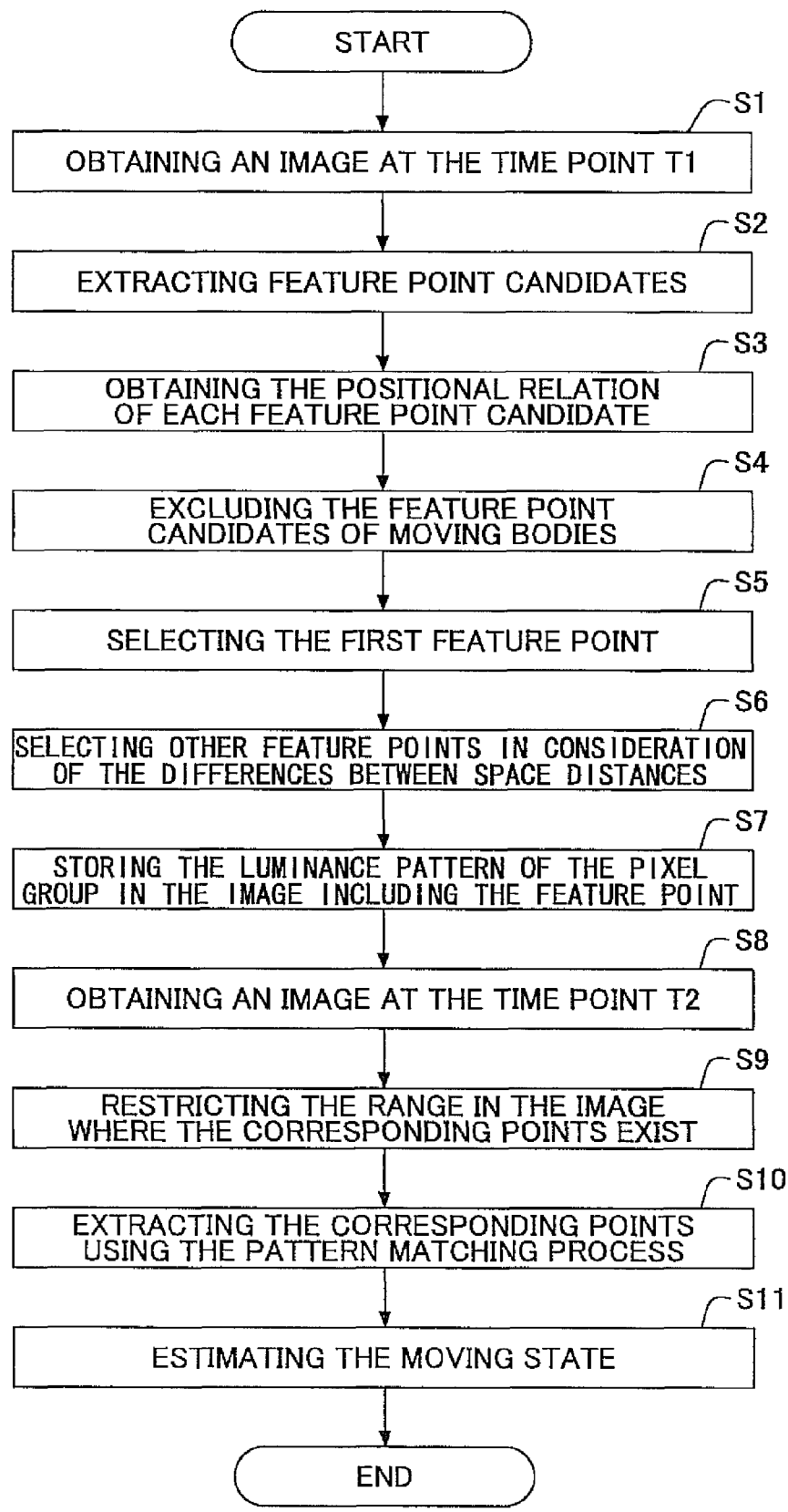

MOVING STATE ESTIMATING DEVICE

TECHNICAL FIELD

The present invention relates to a moving state estimating device which estimates a moving state of a moving body equipped with an image sensor based on images taken by the imaging sensor.

BACKGROUND ART

Conventionally, a perimeter monitoring device for a moving body which estimates a position and an orientation of a target vehicle by employing a monocular camera is known (see Patent Document 1).

This perimeter monitoring device for a moving body extracts four or more feature points on a road surface from an image taken by the monocular camera mounted on the target vehicle at a first time point while the target vehicle is moving. Then, while tracking the feature points, the device extracts a point which corresponds to each of these feature points on a road surface from an image taken by the monocular camera at a second time point. Then, the device derives homography based on the two-dimensional coordinates of the feature points and the two-dimensional coordinates of the corresponding points so that the device derives the relative variation between the position and the orientation of the monocular camera at the first time point and the position and the orientation of the monocular camera at the second time point.

Consequently, this perimeter monitoring device for a moving body can estimate the position and the orientation of the target vehicle equipped with the monocular camera.

[Patent Document 1] Japanese Patent Publication No. 2004-198211

DISCLOSURE OF THE INVENTION

Problems to be Solved by the Invention

However, although Patent Document 1 describes that the perimeter monitoring device for a moving body extracts four or more feature points from a white line, a bump, a difference in level, or a pattern on the road surface imaged by the monocular camera, it does not describe how to select the feature points. Accordingly, the perimeter monitoring device for a moving body may extract biased feature points in terms of distance or direction, and thus reduce the accuracy of estimation of the position and the orientation of the target vehicle.

The perimeter monitoring device for a moving body may also extract a point on a moving body such as other vehicles imaged by the monocular camera as a feature point, and thus reduce the accuracy of estimation of the position and the orientation of the target vehicle.

In view of the above-mentioned problems, it is an object of the present invention to provide a moving state estimating device which achieves more accurate estimation of a moving state of a moving body based on images taken by an imaging sensor mounted on the moving body.

Means for Solving Problems

To achieve the object above, a moving state estimating device according to a first embodiment of the invention includes a feature point candidate extracting part configured to extract feature point candidates in an image taken at a first time point by an imaging sensor mounted on a moving body, a positional relation obtaining part configured to obtain a positional relation of an actual position of each feature point candidate relative to the moving body, a feature point selecting part configured to select a feature point candidate as a feature point based on the positional relation of the feature point candidate, a corresponding point extracting part configured to extract a corresponding point in an image taken by the imaging sensor at a second time point corresponding to the selected feature point, and a moving state estimating part configured to estimate a moving state of the moving body from the first time point to the second time point based on a coordinate of the selected feature point and a coordinate of the corresponding point.

According to a second embodiment of the invention, there is provided a moving state estimating device according to the first embodiment of the invention, wherein the positional relation includes a distance between the actual position of the feature point candidate and the moving body, a direction of the actual position of the feature point candidate as seen from the moving body, or a relative velocity of the actual position of the feature point candidate with respect to the moving body.

According to a third embodiment of the invention, there is provided a moving state estimating device according to the first or the second embodiment of the invention, wherein the feature point selecting part is configured to determine whether the feature point candidate is stationary or not, and to select the feature point from stationary feature point candidates.

According to a fourth embodiment of the invention, there is provided a moving state estimating device according to one of the first, the second, and the third embodiments of the invention, wherein the feature point selecting part is configured to select feature points so that a distance difference between an actual position of each feature point and the moving body is greater than or equal to a predetermined value.

According to a fifth embodiment of the invention, there is provided a moving state estimating device according to one of the first, the second, the third, and the fourth embodiments of the invention, wherein the feature point selecting part is configured to select feature points so that angles between directions of actual positions of each feature point as seen from the moving body are greater than or equal to a predetermined value.

Herein, "a feature point" stands for a coordinate point (a pixel) in an image for use in generation of homography, that is, a coordinate point (a pixel) selected from a feature point candidate under certain conditions. For example, the coordinate system defines a pixel at a lower left corner of an image taken by an imaging sensor as its origin (0,0), while it defines a pixel which is immediately right of the origin as the coordinate (1,0) and a pixel which is immediately above the origin as the coordinate (0,1).

"A feature point candidate" stands for a coordinate point (a pixel) which can be a feature point, that is, an extractable pixel from an image under certain conditions, for example, a pixel whose luminance difference with respect to the adjacent pixel is greater than or equal to a predetermined value or a center pixel of a pixel group whose luminance pattern matches a predetermined luminance pattern, and so on.

"A corresponding point" stands for a coordinate point (a pixel) in an image other than the image in which the selected feature point exists, which coordinate point is included in a photographic subject designated by a coordinate point (a pixel) selected as a feature point in the image in which the selected feature point exists. For example, a corresponding point is extracted from the other image by matching a luminance pattern of a pixel group in the other image in which the corresponding point exists, with a luminance pattern of a pixel group in the image in which the selected feature point exists, for example at the center thereof. The luminance pattern may be a pattern based on other properties such as a color pattern.

"A positional relation" stands for information concerning a relative position between an actual position of a feature point candidate which can be a feature point and a moving body equipped with an imaging sensor which have taken an image. For example, the information may include a distance between an actual position of a feature point candidate which can be a feature point and a target vehicle, a direction of an actual position of a feature point candidate as seen from a target vehicle, a relative velocity of an actual position of a feature point candidate with respect to a target vehicle, and so on.

Effect of the Invention

According to the means above, it is possible for the present invention to provide a moving state estimating device which achieves more accurate estimation of a moving state of a moving body based on images taken by an imaging sensor mounted on the moving body.

BRIEF DESCRIPTION OF THE DRAWINGS

FIG. 3 is a flowchart illustrating a flow of a moving state estimating process.

Figure 1:
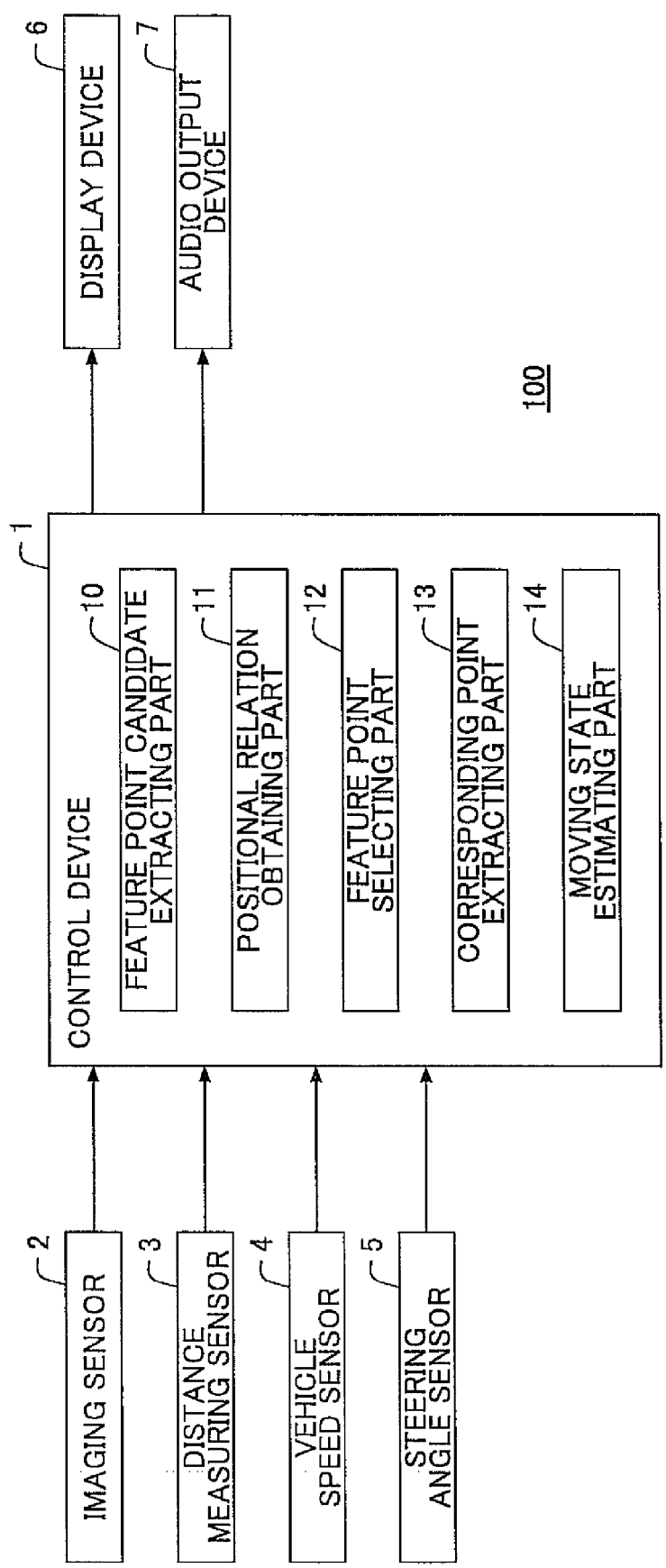
FIG. 1 is a diagram illustrating an embodiment of the moving state estimating device according to the present invention.

EXPLANATION OF REFERENCE SIGNS 1 control device
2 imaging sensor
3 distance measuring sensor
4 vehicle speed sensor
5 steering angle sensor
6 display device
7 audio output device
10 feature point candidate extracting part
11 positional relation obtaining part
12 feature point selecting part
13 corresponding point extracting part
14 moving state estimating part
100 moving state estimating device
D1-D3 space distance
α, β angle between actual directions
P1 first feature point
P2 second feature point
P3 third feature point
V1 target vehicle
V2 parked vehicle
V3 moving vehicle

BEST MODE FOR CARRYING OUT THE INVENTION

With reference to the figures, the description of the best mode for carrying out the present invention is given below.

Embodiments

FIG. 1 is a diagram illustrating an embodiment of the moving state estimating device according to the present invention. The moving state estimating device 100 is an in-car device which estimates a moving state such as translation or rotation of a vehicle. The moving state estimating device 100 includes a control device 1 which is connected to an imaging sensor 2, a distance measuring sensor 3, a vehicle speed sensor 4, a steering angle sensor 5, a display device 6, and an audio output device 7 via an in-car LAN such as CAN (Controller Area Network) or others.

The control device 1 is a computer which includes a CPU (Central Processing Unit), a RAM (Random Access Memory), a ROM (Read Only Memory), and so on. For example, programs corresponding to a feature point candidate extracting part 10, a positional relation obtaining part 11, a feature point selecting part 12, a corresponding point extracting part 13, and a moving state estimating part 14 may respectively be stored in the ROM and the CPU executes a process corresponding to each part.

The imaging sensor 2 is a sensor for taking an image around a vehicle. For example, the imaging sensor 2 may be a camera with an image pickup device such as a CCD (Charge Coupled Device), a CMOS (Complementary Metal Oxide Semiconductor), or others. The imaging sensor 2 may also be an infrared camera capable of night photographing or a stereo camera capable of measuring a distance to a photographic subject.

In an example, the imaging sensor 2 may be placed near a rearview mirror in a vehicle interior with imaging direction fixed, and outputs to the control device 1 images taken at a specified time interval.

The distance measuring sensor 3 is a sensor for obtaining information concerning a relative position between an object around a target vehicle and the target vehicle. For example, the distance measuring sensor 3 may be a millimeter wave sensor, a radar laser sensor, an ultrasonic sensor, or others which may be fixedly mounted near a front grill or a front bumper of the target vehicle. The distance measuring sensor 3 emits a radio wave, a light, or an ultrasonic wave toward the surroundings of the target vehicle, calculates the distance between an object around the target vehicle and the target vehicle, or the relative velocity of the object around the target vehicle, based on the time to reception of its reflected wave or the frequency difference of the reflected wave due to Doppler effect, and then outputs the calculated value to the control device 1.

The vehicle speed sensor 4 is a sensor for measuring a speed of a target vehicle. For example, the vehicle speed sensor 4 may read out the variation in a magnetic field generated by a magnet attached and rotating with each wheel of the target vehicle as magnetic resistance by a MR (Magnetic Resistance) element. Then the vehicle speed sensor 4 detects the magnetic resistance as a pulse signal proportional to the rotating speed of each wheel so that it detects rotating speed of each wheel and thus the speed of the target vehicle, and then outputs the detected value to the control device 1.

The steering angle sensor 5 is a sensor for measuring a rotating angle of a steering shaft relating to a steering angle of a wheel of the target vehicle. For example, the steering angle sensor 5 may read out a magnetic resistance of a magnet embedded in the steering shaft by a MR element, detect a rotating angle of the steering shaft, and then output the detected value to the control device 1.

The display device 6 is a device for displaying a variety of information. For example, the display device 6 may be a liquid crystal display which displays images taken by the imaging sensor 2 or a variety of text messages.

The audio output device 7 is a device for audio outputting a variety of information. For example, the audio output device 7 may be an in-car speaker which audio outputs an audible alarm or an audio assist.

Next is an explanation of each part in the control device 1.

The feature point candidate extracting part 10 is a part for extracting feature point candidates. In an example, the feature point candidate extracting part 10 may apply an image processing technique such as gray scale processing, digitizing processing, edge detecting processing, and so on to an image of a view around a target vehicle taken by the imaging sensor 2, and then extract feature point candidates.

In an example, the feature point candidate extracting part 10 may extract for example a pixel whose luminance difference with respect to an adjacent pixel is greater than or equal to a predetermined value, or a center pixel of a pixel group whose luminance pattern matches a predetermined luminance pattern, and so on as a feature point candidate, and then store the position (coordinate value) of the feature point candidate (i.e. the extracted pixel) in the RAM.

The positional relation obtaining part 11 is a part for obtaining a relative positional relation between an actual position of a feature point candidate and an actual position of the target vehicle. In an example, the positional relation obtaining part 11 obtains, based on an output of the distance measuring sensor 3, a distance between an actual position of a feature point candidate extracted by the feature point candidate extracting part 10 and the distance measuring sensor 3 (i.e. the target vehicle) (hereinafter called "a space distance"), a direction defined by an actual position of a feature point candidate relative to the distance measuring sensor 3 (i.e. the target vehicle) as seen from the distance measuring sensor 3 (i.e. the target vehicle) (hereinafter called "an actual direction"), a velocity of an actual position of a feature point candidate relative to the distance measuring sensor 3 (i.e. the target vehicle) (hereinafter called "a relative velocity"), or others.

The positional relation obtaining part 11 stores the space distance, the actual direction and the relative velocity obtained for each feature point candidate in the RAM in relation to the coordinate value of each feature point candidate stored by the feature point candidate extracting part 10.

The feature point selecting part 12 is a part for selecting a feature point from a feature point candidate(s). In an example, based on the relative velocity of the actual position of a feature point candidate with respect to the distance measuring sensor 3 (i.e. the target vehicle) obtained by the positional relation obtaining part 11, the feature point selecting part 12 excludes a feature point candidate whose actual position is on a moving body (for example, a pedestrian or a moving vehicle and so on) from a feature point candidate to be used in a subsequent process, and selects a feature point candidate whose actual position is on a stationary body (for example, a road indication, a traffic sign, a guard rail, a traffic light, or a parked vehicle and so on) as a feature point candidate to be used in the subsequent process.

The reason for this is that selecting a feature point candidate whose actual position is on a moving body as a feature point candidate to be used in a subsequent process makes it difficult to distinguish the displacement of the feature point from the displacement of the target vehicle, which would reduce the accuracy of the estimation of the moving state of the target vehicle.

Based on the space distance which is the distance between the actual position of the feature point candidate and the distance measuring sensor 3 (i.e. the target vehicle) for example, the feature point selecting part 12 selects as a first feature point among plural feature point candidates the feature point candidate whose space distance is the smallest among the feature point candidates. Alternatively, the feature point selecting part 12 may select as the first feature point the feature point candidate whose space distance is the largest among the feature point candidates.

Alternatively, based on the actual direction which is the direction defined by the actual position of the feature point candidate relative to the distance measuring sensor 3 (i.e. the target vehicle) as seen from the distance measuring sensor 3 (i.e. the target vehicle), the feature point selecting part 12 may select as the first feature point the feature point candidate whose actual direction relative to a predetermined direction is the closest to a predetermined angle and is greater than or equal to the predetermined angle (for example, 0 degrees as in the case where the angle increases clockwise beginning at a frontward direction of the target vehicle as 0 degrees).

Based on the space distance of the first feature point and the space distances of other feature point candidates, the feature point selecting part 12 selects as a second feature point among plural feature point candidates the feature point candidate whose difference between its space distance and the space distance of the first feature point is the smallest among the feature point candidates and is greater than or equal to a predetermined value.

The feature point selecting part 12 continues the selection of feature points such as a third feature point, a fourth feature point, a fifth feature point, and so on, until the feature point selecting part 12 selects a necessary and sufficient number of feature points for generating homography.

Based on the actual direction of the first feature point and the actual direction of other feature point candidates, the feature point selecting part 12 may select as the second feature point among plural feature point candidates the feature point candidate whose angle between its actual direction and the actual direction of the first feature point is the smallest among the feature point candidates and is greater than or equal to a predetermined value.

Similarly, the feature point selecting part 12 selects the third feature point, the fourth feature point, the fifth feature point, and so on, in the same way that the feature point selecting part 12 selects the second feature point, and continues the selection of feature points until the feature point selecting part 12 selects a necessary and sufficient number of feature points for generating homography.

The feature point selecting part 12 may select as a feature point a feature point candidate for which both its space distance and its actual direction meet the respective predetermined conditions. Alternatively, the feature point selecting part 12 may divide the image taken by the imaging sensor 2 into a plurality of small sections and select a predetermined number of feature points from feature point candidates in each small section.

Figure 2A:
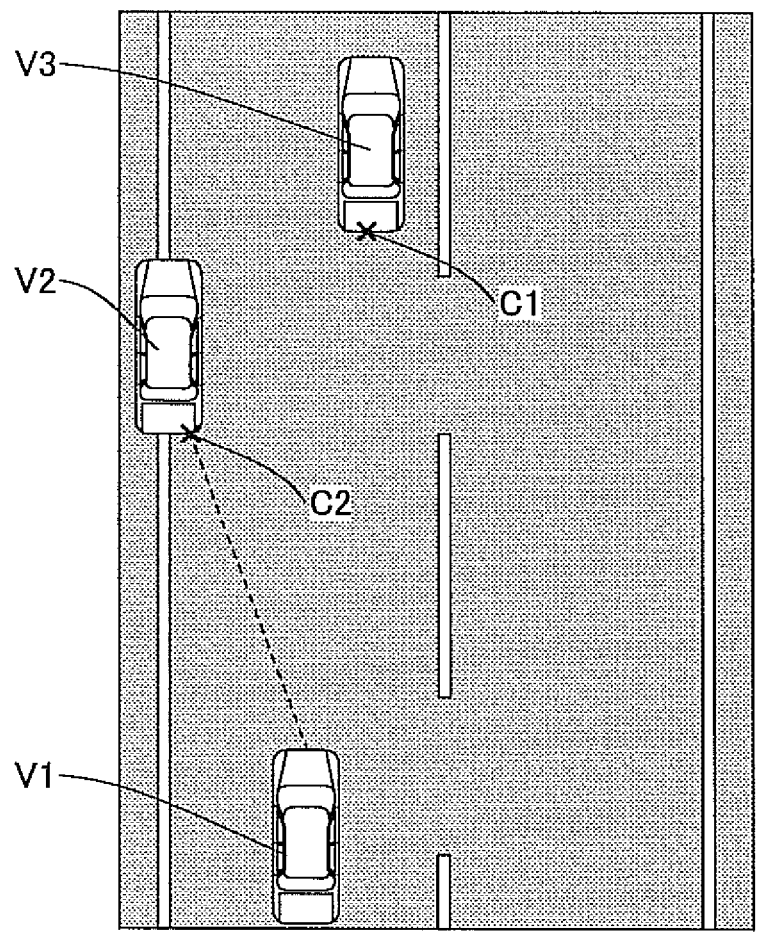
FIG. 2A is a first illustration of a method for selecting a feature point from a plurality of feature point candidates.
Figure 2B:
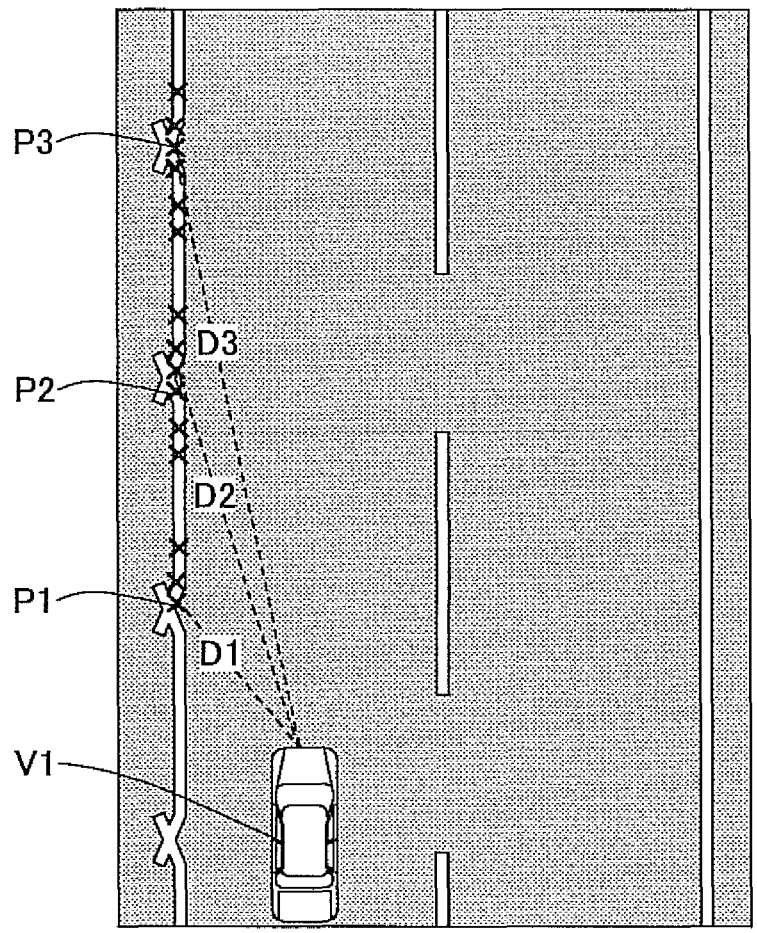
FIG. 2B is a second illustration of the method for selecting a feature point from a plurality of feature point candidates.
Figure 2C:
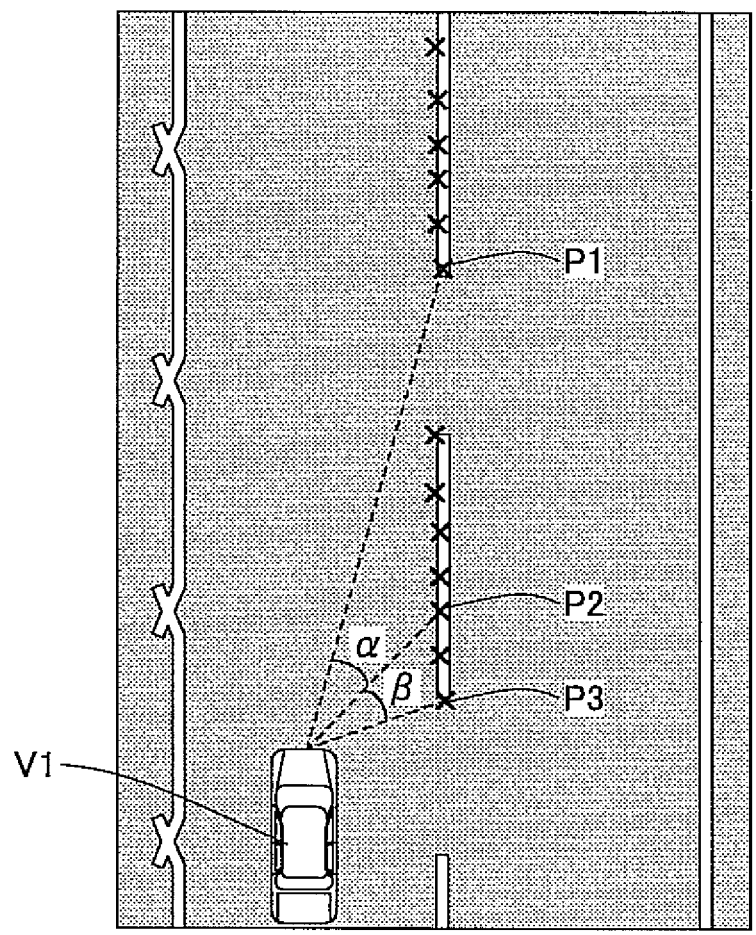
FIG. 2C is a third illustration of the method for selecting a feature point from a plurality of feature point candidates.

FIGS. 2A, 2B, and 2C are each an illustration of a method for selecting a feature point from a plurality of feature point candidates. FIG. 2A illustrates that the moving state estimating device 100 extracts feature point candidates ("X" marks in FIG. 2A) on other vehicles V2 and V3, obtains the relative velocity of the actual position of each feature point candidate with respect to the target vehicle V1, and selects the feature point candidate C2 of the parked vehicle V2 as the feature point candidate to be used in a subsequent process while excluding the feature point candidate C1 of the moving vehicle V3 as a feature point candidate to be used in the subsequent process.

FIG. 2B illustrates that the moving state estimating device 100 extracts feature point candidates ("X" marks in FIG. 2B) on guard rails, obtains the space distances between the target vehicle V1 and each feature point candidate, selects as the first feature point P1 the feature point candidate whose space distance is the smallest among the feature point candidates, and then selects the second feature point P2 so that the difference between the space distance D1 of the first feature point P1 and the space distance D2 of the second feature point P2 is greater than or equal to a predetermined value, and selects the third feature point P3 so that the difference between the space distance D2 of the second feature point P2 and the space distance D3 of the third feature point P3 is greater than or equal to the predetermined value. It will be assumed that the fourth feature point (not shown in FIG. 2B) or later are selected similarly.

FIG. 2C illustrates that the moving state estimating device 100 extracts feature point candidates ("X" marks in FIG. 2C) on road indications (traffic lane lines), obtains the actual direction of each feature point candidate (i.e. the direction defined by an actual position of the feature point candidate relative to the target vehicle V1 as seen from the target vehicle V1), selects as the first feature point P1 the feature point candidate whose actual direction relative to a frontward direction of the target vehicle is the closest to 0 degrees among the feature point candidates and is greater than or equal to 0 degrees, and then selects the second feature point P2 so that the angle α between the actual direction of the first feature point P1 and the actual direction of the second feature point P2 is greater than or equal to a predetermined value, and selects the third feature point P3 so that the angle β between the actual direction of the second feature point P2 and the actual direction of the third feature point P3 is greater than or equal to a predetermined value. It will be assumed that the fourth feature point (not shown in FIG. 2C) or later are selected similarly.

The feature point selecting part 12 selects a necessary and sufficient number of feature points for calculating homography. The feature point selecting part 12 stores for each feature point the luminance pattern of the pixel group (5×5 pixels for example) in which the feature point exists, in the RAM so that, as will be described hereinafter, the corresponding point extracting part 13 can extract a point corresponding to the feature point from a later image by use of a pattern matching process.

The corresponding point extracting part 13 is a part for extracting a corresponding point. In an example, the corresponding point extracting part 13, by using a pattern matching process, extracts a corresponding point for each feature point selected by the feature point selecting part 12 by means of matching a luminance pattern in the later image (hereinafter called "the second image", the second image is an image taken by the imaging sensor 2 after a predetermined time interval has passed since the first image had been taken) which is different from the image that had been taken by the imaging sensor 2 and used by the feature point candidate extracting part 10 for extracting the feature point candidates (hereinafter called "the first image"), with the luminance pattern relating to the feature point stored in the RAM by the feature point selecting part 12.

In an example, the corresponding point extracting part 13 may restrict the range in the image which is to be subjected to the pattern matching process, for example, by roughly estimating a moving state of the vehicle based on the outputs of the vehicle speed sensor 4 and the steering angle sensor 5. This is to improve the efficiency of the pattern matching process.

The corresponding point extracting part 13 extracts a corresponding point (a corresponding point corresponds to a feature point and is called "a primary corresponding point" herein in order to differentiate it from a later-mentioned secondary corresponding point), and the corresponding point extracting part 13 stores the luminance pattern of the pixel group (5×5 pixels for example) in which the primary corresponding point exists, in the RAM so that the corresponding point extracting part 13, by using a pattern matching process, can extract a subsequent corresponding point (the secondary corresponding point) which corresponds to the primary corresponding point from still a later image.

By tracking a feature point in sequence according to an order of, for example, a feature point, a primary corresponding point, a secondary corresponding point, a tertiary corresponding point, etc., the moving state estimating device 100 can continuously estimate the moving state of the target vehicle beginning at the time when the moving state estimating device 100 obtains the image used for the selection of the feature point.

The moving state estimating part 14 is a part for estimating a moving state of a target vehicle. In an example, the moving state estimating part 14 generates homography by using the two-dimensional coordinate of the feature point selected by the feature point selecting part 12 and the two-dimensional coordinate of the corresponding point extracted by the corresponding point extracting part 13. The moving state estimating part 14 estimates translation or rotation of the target vehicle made during a time period from the time point when the imaging sensor 2 had taken the first image used for the extraction of the feature point candidate by the feature point candidate extracting part 10 until the time point when the imaging sensor 2 has taken the second image used for the extraction of the corresponding point by the corresponding point extracting part 13.

By initiating estimation of a moving state of a target vehicle when the control device 1 detects an obstacle (a curbstone, a concrete block wall or others for example) within a predetermined range from the target vehicle based on an output of the distance measuring sensor 3, the control device 1 can determine, for example, whether there is a chance that the target vehicle may come into contact with the obstacle based on the estimated moving state of the target vehicle even if the obstacle deviates from the imaging area of the imaging sensor 2 when the target vehicle turns left or right.

If the control device 1 determines that there is a high probability that the target vehicle will come into contact with an obstacle, the control device 1 invites a driver's attention by making the display device 6 display a warning message or by making the audio output device 7 output a warning sound.

Based on the estimated moving state of the target vehicle, the control device 1 may make the display device 6 display a quasi-image which represents the positional relation between the target vehicle and the obstacle, and may assist the driving of the target vehicle in order to avoid contact with the obstacle.

With reference to FIG. 3, the process by which the moving state estimating device 100 estimates the moving state of the target vehicle (hereinafter called "the moving state estimating process") is explained in detail. FIG. 3 is a flowchart illustrating the flow of the moving state estimating process. The control device 1 of the moving state estimating device 100 executes the moving state estimating process repeatedly, for example, after the blinker has been manipulated, until the vehicle completes the left/right turn.

Alternatively, the moving state estimating device 100 can execute the moving state estimating process repeatedly in case that the moving state estimating device 100 detects the situation that there is a high probability that the target vehicle may come into contact with an obstacle such as when the speed of the target vehicle is less than a predetermined value, or when the shift position is set to "R (Reverse)" position, or others.

First, the control device 1 obtains the image data taken by the imaging sensor 2 at a time point T1 (Step S1), and then by use of the feature point candidate extracting part 10, applies image processing to the image data to extract feature point candidates, a pixel extracted being one whose luminance difference with respect to an adjacent pixel is greater than or equal to a predetermined value (Step S2).

Next, by use of the positional relation obtaining part 11, the control device 1 obtains the positional relation between the actual position of each feature point candidate and the position of the distance measuring sensor 3 based on the output value from the distance measuring sensor 3 (Step S3). The control device 1 stores the positional relation (i.e. the relative velocity, the space distance and the actual direction) of each feature point candidate in relation to the coordinate value of the feature point candidate in the RAM.

Next, by use of the feature point selecting part 12, the control device 1 determines for each feature point candidate whether the actual position of the feature point candidate remains stationary or is in motion based on the relative velocity of the actual position of the feature point candidate obtained by the positional relation obtaining part 11, the speed of the target vehicle outputted by the vehicle speed sensor 4, and the steering angle (traveling direction) of the target vehicle outputted by the steering angle sensor 5. By use of the feature point selecting part 12, the control device 1 excludes a feature point candidate whose actual position is on a moving body from a feature point candidate to be used in a subsequent process, while keeping a feature point candidate whose actual position is on a stationary body as a feature point candidate to be used in the subsequent process (Step S4).

Next, by use of the feature point selecting part 12, the control device 1 selects as a first feature point the feature point candidate whose space distance is the smallest among the space distances of the feature point candidates obtained by the positional relation obtaining part 11 (Step S5).

Next, after setting the space distance of the actual position of the first feature point as the basis, by use of the feature point selecting part 12, the control device 1 selects other feature points in sequence so that the difference between each space distance is greater than or equal to a predetermined value (Step S6).

The control device 1 selects a necessary and sufficient number of feature points for calculating homography, by use of the feature point selecting part 12, and stores for each selected feature point the luminance pattern of the pixel group (5×5 pixels for example) in which the feature point exists, in the RAM so that a corresponding point which corresponds to the feature point may be extracted from an image taken subsequently (Step S7).

Next, the control device 1 obtains image data taken by the imaging sensor 2 at a time point T2 (the time point T2 is later than the time point T1) (Step S8). Then, by use of the corresponding point extracting part 13, the control device 1 applies the same image processing as in Step S1 to the image data taken at the time point T2 and, with respect to the luminance pattern stored for each feature point, restricts the range in the image, which is to be subjected to a pattern matching process, based on the outputs of the vehicle speed sensor 4 and the steering angle sensor 5 (Step S9). This is to improve the efficiency of the pattern matching process. In addition, the corresponding point extracting part 13 may restrict the range in the image which is to be subjected to the pattern matching process based on the coordinate of each feature point, or may perform the pattern matching process without restricting the range in the image.

Next, by use of the corresponding point extracting part 13, the control device 1 performs the pattern matching process for each restricted range of the image by matching the luminance pattern in the restricted range with the respective luminance pattern of the feature point, and extracts the center pixel of the matched luminance pattern as the point which corresponds (i.e. the "corresponding point") to the feature point (Step S10).

Lastly, by use of the moving state estimating part 14, the control device 1 calculates homography based on the two-dimensional coordinate of the respective feature point selected by the feature point selecting part 12 and the two-dimensional coordinate of the respective corresponding point extracted by the corresponding point extracting part 13. Then the control device 1 estimates the state of translation and rotation of the target vehicle made between the time point T1 and the time point T2 (Step S11). Then the control device 1 terminates this moving state estimating process.

In this way, the moving state estimating device 100 selects feature points whose actual positions are not biased in terms of distance and direction while combining the output of the imaging sensor 2 and the output of the distance measuring sensor 3, and calculates homography based on the coordinates of those feature points and the coordinates of the corresponding points which correspond to those feature points. Thus, the moving state estimating device 100 can estimate the moving state of the imaging sensor 2 and therefore the moving state of the target vehicle with a high degree of accuracy.

This is because, when there is a bias in the actual positions of the feature points, the moving state estimating device 100 becomes easily affected by noises which come to be mixed in while selecting those feature points and which arise from the vibration of the target vehicle or the photographic subject, the error in the image processing or others, and because the moving state estimating device 100 can alleviate the effect of those noises by distributing the actual positions of the feature points in terms of the distance and the direction.

Additional Statement

Although the present invention has been described above with respect to preferable embodiments, the present invention is not to be thus limited, and the above-described embodiments are to receive various modifications and substitutions without departing from the scope of the present invention.

For example, in the embodiments above, although the moving state estimating device 100 obtains the space distance, the actual direction, and the relative velocity of the actual position of the feature point candidate based on the output of the distance measuring sensor 3, the moving state estimating device 100 may obtain the space distance, the actual direction, and the relative velocity of the actual position of the feature point candidate based on the output of a stereo camera capable of measuring a distance to a photographic subject. In such case, the moving state estimating device 100 can omit the distance measuring sensor 3.

In addition, in the embodiments above, although the moving state estimating device 100 estimates the moving state of the vehicle, it may estimate the moving state of other moving bodies such as an industrial robot, a vessel, a motorcycle, an aircraft, and so on. In such case, the moving state estimating device 100 may estimate the moving state in the vertical direction in addition to the moving state in the plane surface from front to back and from side to side.

Moreover, in the embodiments above, although the corresponding point extracting part 13 employs the pattern matching process to extract the point which corresponds (i.e. the "corresponding point") to the feature point, the corresponding point extracting part 13 may employ any other technique as far as it can extract the corresponding point. For example, the corresponding point extracting part 13 may extract the corresponding point with an optical flow technique.

The present application claims priority from Japanese Patent Application No. 2007-332275 filed on Dec. 25, 2007, which is incorporated herein by reference.

The invention claimed is:

1. A moving state estimating device comprising:
a feature point candidate extracting part configured to extract initial feature point candidates in a first image taken at a first time point by an imaging sensor mounted on a moving body;
a positional relation obtaining part configured to obtain a positional relation of an actual position of each initial feature point candidate relative to the moving body based on an output of a distance measuring sensor mounted on the moving body;
a feature point selecting part configured to select one or more of the initial feature point candidates as one or more of selected feature points based on the positional relation;
a corresponding point extracting part configured to extract a corresponding point in a second image taken by the imaging sensor at a second time point corresponding to each selected feature point; and
a moving state estimating part configured to estimate a moving state of the moving body from the first time point to the second time point based on a coordinate of each selected feature point and a coordinate of each corresponding point.

2. A moving state estimating device according to claim 1, wherein the positional relation includes a distance between the actual position of the initial feature point candidate and the moving body, a direction of the actual position of the initial feature point candidate as seen from the moving body, or a relative velocity of the actual position of the initial feature point candidate with respect to the moving body.

3. A moving state estimating device according to claim 1, wherein the feature point selecting part is configured to determine whether each initial feature point candidate is stationary or not, and to select the one or more selected feature points from stationary initial feature point candidates.

4. A moving state estimating device according to claim 1, wherein the feature point selecting part is configured to select one or more selected feature points so that a distance difference between an actual position of each initial feature point candidate and the moving body is greater than or equal to a predetermined value.

5. A moving state estimating device according to claim 1, wherein the feature point selecting part is configured to select one or more selected feature points so that angles between directions of actual positions of each initial feature point candidate as seen from the moving body are greater than or equal to a predetermined value.

6. A moving state estimating device comprising:
a feature point candidate extracting part configured to extract initial feature point candidates in a first image taken at a first time point by an imaging sensor mounted on a moving body;
a positional relation obtaining part configured to obtain a positional relation of an actual position of each initial feature point candidate relative to the moving body;
a feature point selecting part configured to select one or more of the initial feature point candidates as one or more of selected feature points based on the positional relation and such that a distance difference between an actual position of each initial feature point and the moving body is greater than or equal to a predetermined value;
a corresponding point extracting part configured to extract a corresponding point in a second image taken by the imaging sensor at a second time point corresponding to the selected feature point; and
a moving state estimating part configured to estimate a moving state of the moving body from the first time point to the second time point based on a coordinate of the selected feature point and a coordinate of the corresponding point.

7. A moving state estimating device comprising:
a feature point candidate extracting part configured to extract initial feature point candidates in an first image taken at a first time point by an imaging sensor mounted on a moving body;
a positional relation obtaining part configured to obtain a positional relation of an actual position of each initial feature point candidate relative to the moving body;
a feature point selecting part configured to select one or more of the initial feature point candidates as one or more of selected feature points based on the positional relation and such that angles between directions of actual positions of each initial feature point as seen from the moving body are greater than or equal to a predetermined value;
a corresponding point extracting part configured to extract a corresponding point in a second image taken by the imaging sensor at a second time point corresponding to the selected feature point; and
a moving state estimating part configured to estimate a moving state of the moving body from the first time point to the second time point based on a coordinate of the selected feature point and a coordinate of the corresponding point.

* * * * *